April 13, 1965  T. S. TAYLOR  3,177,984
BOLSTER MOUNTED BRAKE UNIT
Filed Sept. 28, 1962  5 Sheets-Sheet 1
FIG. 1
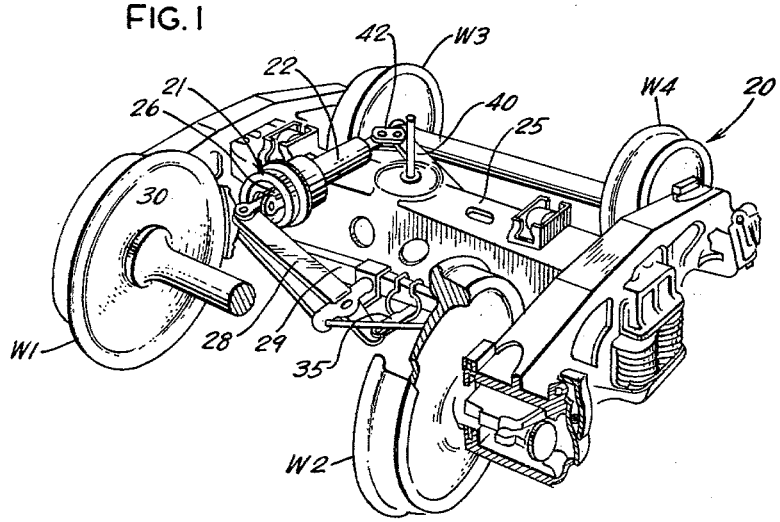
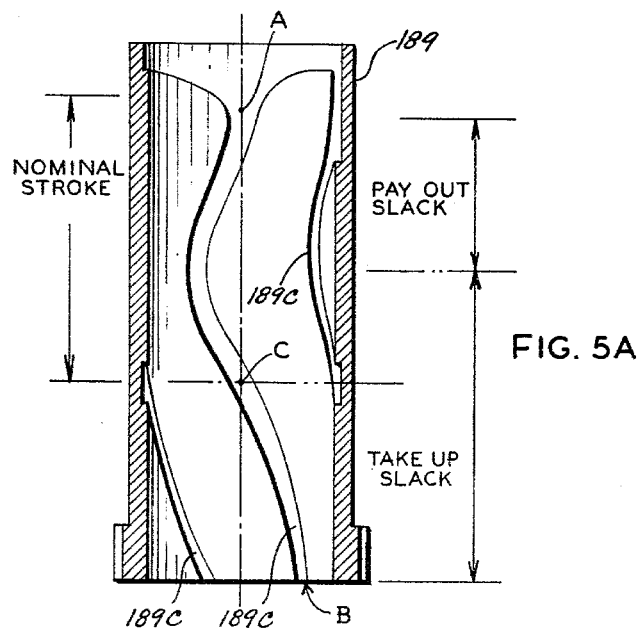
FIG. 5A
INVENTOR.
THOMAS S. TAYLOR
BY
Wallace Kinger and Horn
ATTORNEYS

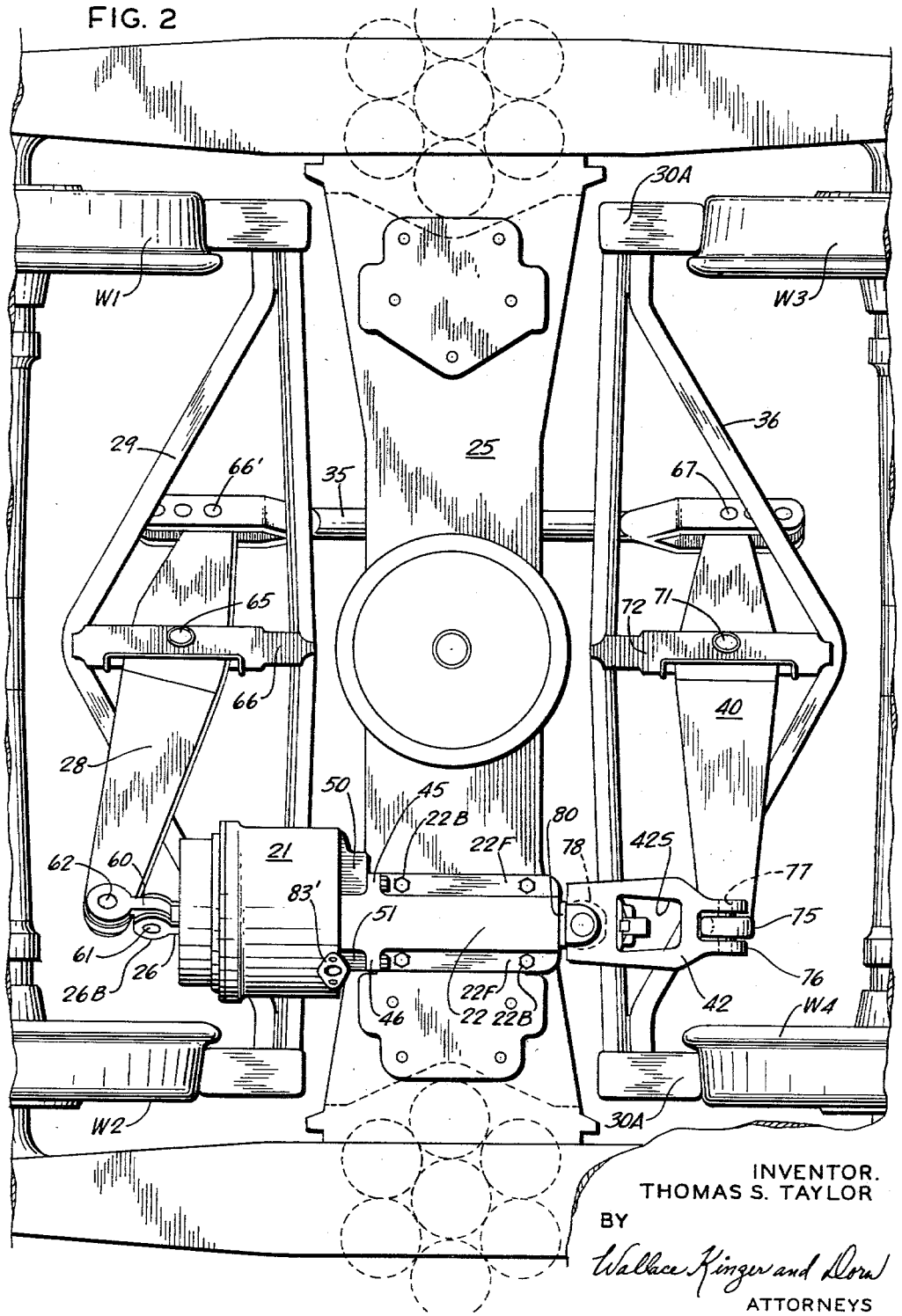

April 13, 1965

T. S. TAYLOR 3,177,984

BOLSTER MOUNTED BRAKE UNIT

Filed Sept. 28, 1962

INVENTOR.
THOMAS S. TAYLOR
BY
Wallace Kinger and Dorn
ATTORNEYS

April 13, 1965  T. S. TAYLOR  3,177,984
BOLSTER MOUNTED BRAKE UNIT
Filed Sept. 28, 1962  5 Sheets-Sheet 4

INVENTOR.
THOMAS. S. TAYLOR
BY
Wallace Kinzer
and Dorr
ATTORNEYS

April 13, 1965   T. S. TAYLOR   3,177,984
BOLSTER MOUNTED BRAKE UNIT
Filed Sept. 28, 1962   5 Sheets-Sheet 5

HANDBRAKE FORCE

INVENTOR.
THOMAS S. TAYLOR
BY
Wallace Kinzer and Horn
ATTORNEYS

United States Patent Office 3,177,984
Patented Apr. 13, 1965

3,177,984
BOLSTER MOUNTED BRAKE UNIT
Thomas S. Taylor, Suffern, N.Y., assignor to American Brake Shoe Company, New York, N.Y., a corporation of Delaware
Filed Sept. 28, 1962, Ser. No. 226,924
17 Claims. (Cl. 188—197)

This invention relates to a brake unit for the truck of a railroad car.

Technological changes in the railroad industry have introduced certain difficulties in continued use of the conventional braking system. These technological changes are characterized by car designs that include a lower platform and/or a deeper center sill, long cars and special purpose cars such as high capacity tank cars and bottom dump hopper cars. Equipment manufacturers are therefore giving serious consideration to proposals involving brake systems that are confined to the truck—so-called package brake units.

Brake units of the foregoing kind have been proposed. Not all are practical, but some are available on the market. Even these that have obtained a measure of success have certain well recognized disadvantages. Thus, a plurality of cylinders are required for each truck, consuming a great deal of compressed air, and in some instances the cylinders are unsprung masses subject to direct rail shock. Special bolster designs are sometimes required, and a sufficiently powerful hand brake may not always be feasible.

The prior so-called package brake units display recognized sensitivity to operating variations such as the type of shoe and the amount of shoe wear, and slack adjusters are seldom capable of being associated with the basic package brake unit.

The object of the present invention is to construct a package brake unit for a railroad car characterized by a unit confined to the truck, including a single cylinder for each truck and which will accommodate either a manual or an automatic slack adjuster.

Another object of the present invention is to enable both the cylinder and the slack adjuster to be secured to the bolster so as to be spring supported therewith, and a related object is to assure continued and effective operation of the unit by linkages having universal joints that allow for movement of the cylinder and slack adjuster independently of the linkages of the brake unit.

Another object of the present invention is to enable a brake unit to be constructed of the foregoing character but which necessitates relatively few changes in truck design so that there is involved a minimum departure from accepted or standard construction including bolsters, brake beams, levers, cast iron shoes, and hand brakes. The unit can accommodate car weight and shoe friction variations not only through changes in the leverage and cylinder size, but also by altering the size of an air reservoir in the cylinder as will be explained.

The cylinder is of unusual geometry to permit universal movement of the push rod, and this constitutes another object of the present invention. Even so, the cylinder can be serviced without removing the unit from the car truck, and without the need for special tools.

Under the present invention, the slack adjuster is mounted on top of the bolster immediately behind the air cylinder in such a manner as to accomplish slack adjustment by positioning the dead lever strut. In conventional equipment, the dead lever strut is secured to the bolster, stressing and tending to rotate the bolster. In the present arrangement, the forces are balanced by in effect connecting the dead lever strut to the cylinder pressure head through the slack adjuster, and this represents another object of the present invention.

The slack adjuster is characterized by a housed or confined screw operating in a threaded rod. This rod is the extensible element of the slack adjuster. The screw can be turned, to take up or play out the rod, manually or automatically, and such arrangement is another object of the present invention.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a perspective view of the truck of a railroad car equipped with a brake unit of the present invention;

FIG. 2 is a plan view of the brake unit installed upon a conventional truck;

FIG. 5A illustrates a cam contour; and

Figure 3:
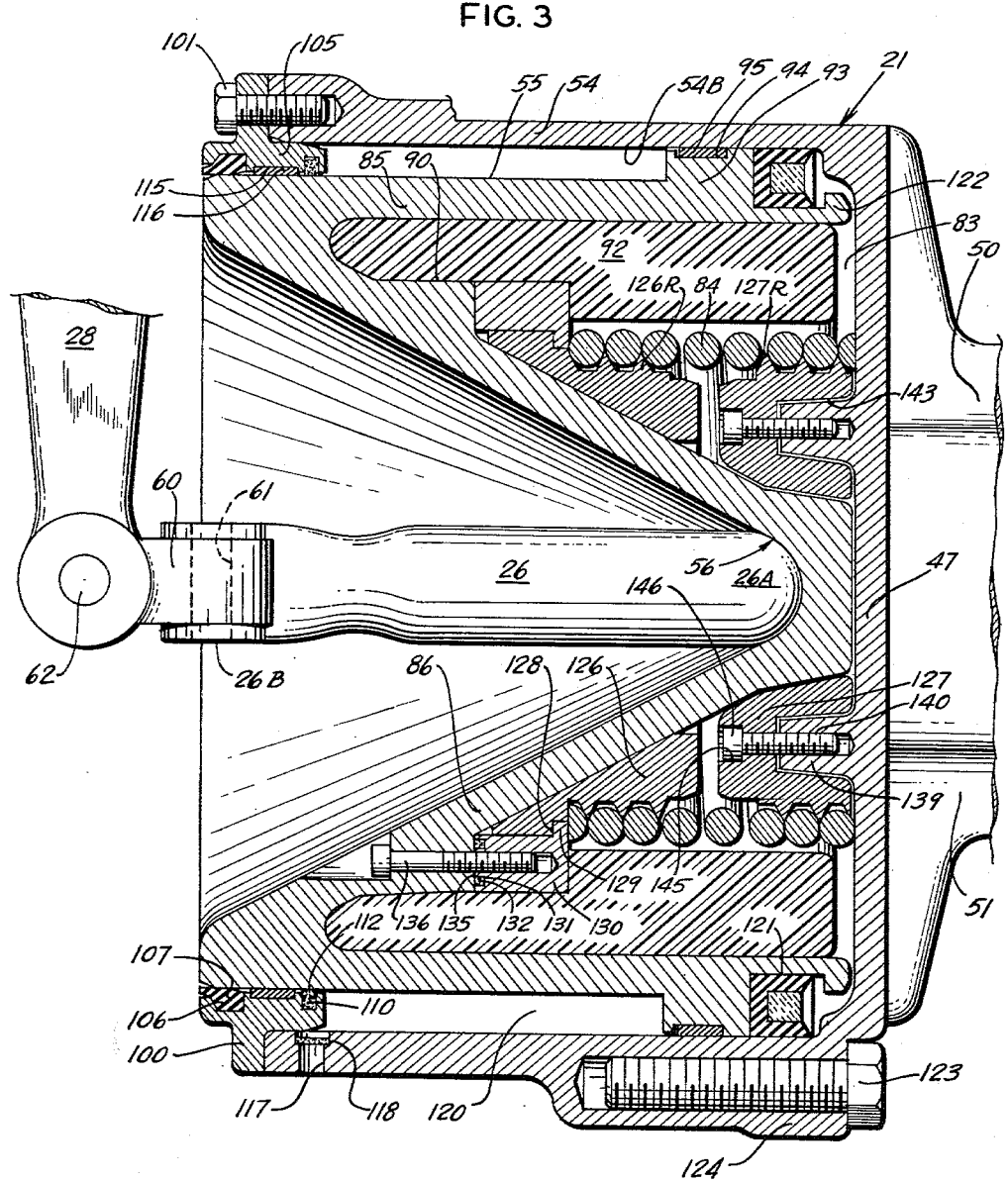
FIG. 3 is a sectional view of the brake cylinder.

The present invention is illustrated in FIG. 1 included as part of a truck 20 of known construction for a railroad car. The brake unit includes a cylinder 21 and a slack adjuster housing 22 secured to the bolster 25 of the truck specifically in the manner hereinafter described.

Upon admission of fluid under pressure to the cylinder 21, a sleeve-like piston therein is moved outwardly away from the bolster 25 of FIG. 1, causing a push rod 26 to apply a braking force to what amounts to the upper end of a live lever 28. The live lever thereupon advances carrying its beam 29 along to present the associated brake shoes 30, at the ends of the beam 29, to the treads of the car wheels W1 and W2. At the same time, the bottom rod 35, FIGS. 1 and 2, becomes effective through the dead lever 40 in a well-known manner to move the beam 36 associated therewith, FIG. 2, to present the associated shoes 30A, to the wheels W3 and W4.

The reaction forces at the dead lever are transmitted through a strut 42, at the upper end thereof, to the movable slack adjuster element contained within the slack adjuster housing 22.

It will be recognized from what is shown in FIG. 1 that the cylinder 21 and the slack adjuster housing 22 are located adjacent one end of the bolster 25 in such position as to enable the necessary braking forces to be applied to the upper end of the live lever, with the reaction force at the dead lever 40 being applied to the slack adjusting element within the slack adjuster housing 22, the reaction force being applied substantially parallel to the axis of the cylinder 21.

The cylinder 21 can, of course, be located at either end or side of the bolster 25, and in FIG. 2 the cylinder 21 is illustrated at the end of the bolster adjacent the wheels W2 and W4 in contrast to what is shown in FIG. 1.

Referring to the details of FIG. 2, the cylinder 21 is fixed, relative to the bolster 25, through the slack adjuster housing 22, and in this connection it will be observed that the slack adjuster housing 22, FIG. 2, includes saddle type flanges 22F on opposite sides thereof. These flanges are secured by bolts 22B to the upper surface of the bolster 25.

The end of the slack adjuster housing 22 that is adjacent the cylinder 21 is provided with a pair of sturdy lugs 45 and 46.

Figure 4:
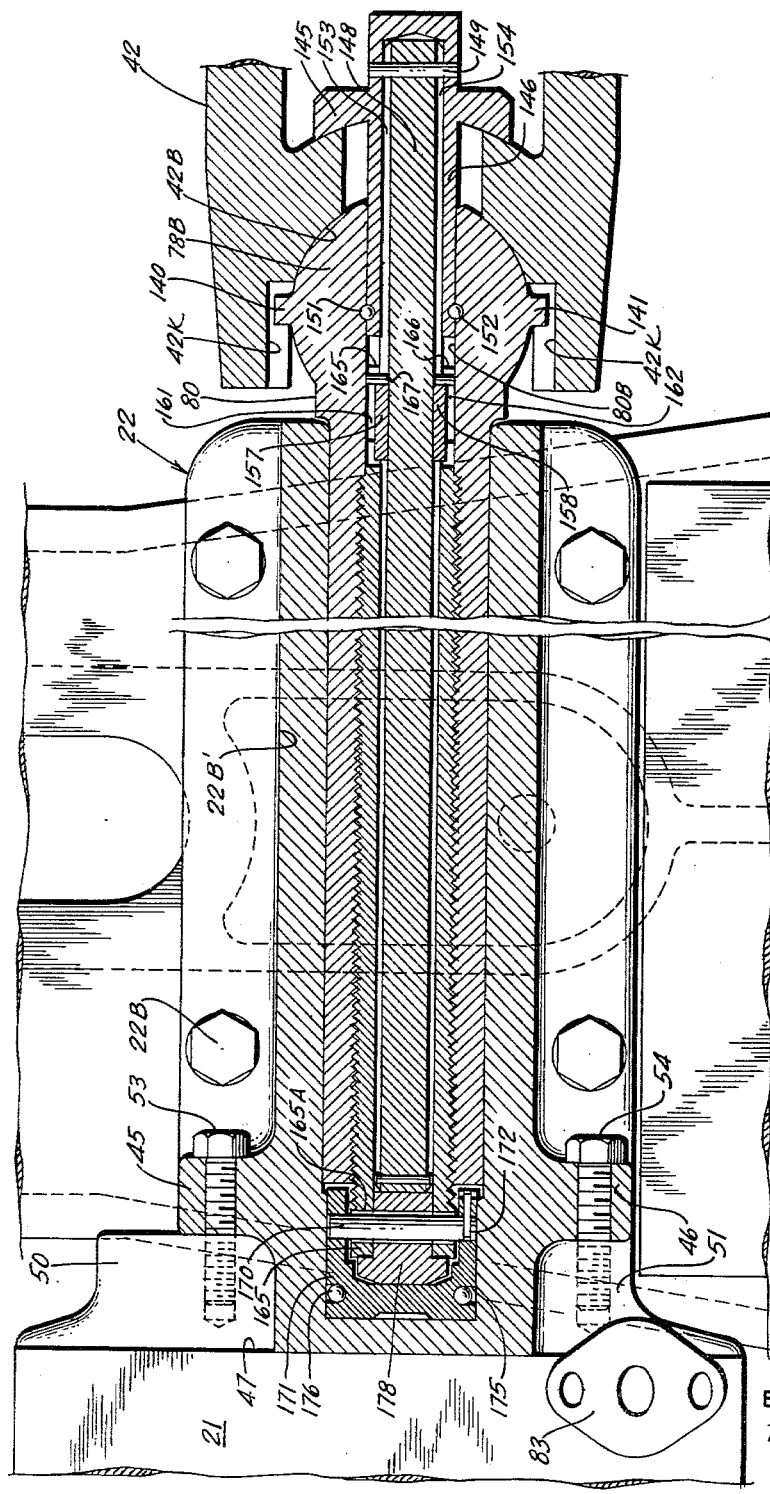
FIG. 4 is a sectional view of the manual slack adjuster.

The end wall 47, FIG. 3, of the cylinder 21 adjacent the lugs 45 and 46 is provided with a pair of lugs 50 and 51, FIG. 4, that are adapted to abut the lugs 45 and 46 of the slack adjuster housing. Bolts 53 and 54, FIG. 4, are inserted through openings in the lugs 45 and 46 so that the heads thereof bear against outer surfaces of the lugs 45 and 46. The threaded ends of these attaching bolts are secured in tapped openings in the lugs 50 and 51 of the end wall 47 of the cylinder 21, whereby the cylinder 21 and slack adjuster housing are firmly secured as a unit to the bolster 25.

The details of the cylinder will be described hereinafter, but it may be observed at this point that the cylinder 21 includes an annular sleeve-like side wall 54 which is open at the end opposite the end wall 47. A cup-shaped piston 55 is located concentrically within the side wall 54 of the cylinder 21, and the outer end of the piston 55 is formed with a rearwardly extending V-shaped recess terminating at an arcuate semi-circular socket 56 at the geometric center of the piston 55. The push rod 26, FIG. 3, has an end 26A complementally seated in the socket 56 so that a universal joint is established between the piston 55 and the push rod 26.

Upon admission of fluid under pressure to the interior of the cylinder in the manner described hereinafter, the piston 55 is advanced forwardly, or to the left as viewed in FIG. 3, moving the push rod 26 forwardly. The end of the push rod 26 opposite the end 26A is bifurcated at 26B, FIG. 2, and one end of a universal joint link 60 is pivotally connected thereto by a pin 61. The end of the link 60 opposite the pin 61 is bifurcated, and is pivotally connected by a pin 62 to the adjacent end of the live lever 28.

The live lever 28 intermediate its ends is fulcrummed by a pin 65, FIG. 2, to the center strut 66 of the brake beam 29. The end of the live lever 28 opposite the universal link 60 is pivotally connected through a pin 66' to the adjacent bifurcated end of the bottom rod 35 which, as shown in the drawings, extends beneath the bolster 25.

The opposite end of the bottom rod 35 is pivotally connected to the adjacent end of the dead lever 40 through a pin 67. As in the instance of the live lever 28, the dead lever is fulcrummed relative to its beam 36 by a pin 71 carried in the center strut 72 of the beam 36.

The dead lever 40, like the live lever 28, is disposed at an angle to the horizontal, and the upper end thereof is formed with an upstanding lug 75. The dead lever strut 42 above referred to has a bifurcated end 76 embracing the dead lever lug 75, and a pin connection 77 is afforded therebetween to establish a pivotal connection between the upper end of the dead lever 40 and the strut 42.

The strut 42, it will be recalled, applies the reaction brake force parallel to the axis of the cylinder 21, and again, in order to permit universal movements, the end of the strut 42 opposite the bifurcation 76 includes a ball joint 78 which universally connects the strut 42 to a rod 80 which is the axially extensible slack adjusting element of the slack adjuster.

Inasmuch as the bolster is supported by springs carried by the side frames of the truck as shown in FIG. 1, the cylinder and the slack adjuster housing in effect are spring supported, and the universal joints identified above permit the sprung cylinder 21 and the adjuster housing 22 to move vertically with the bolster, due to spring deflections, and transversely, because of truck lateral displacements, with respect to the brake beams and the associated levers. In this same connection, it may be observed that the brake unit of the present invention can be used with brake beams of standard construction, and the bottom rod 35, live and dead levers, and associated struts are familiar elements in car construction.

*Cylinder construction*

The cylinder and piston under the present invention are constructed to take into account the universal movements discussed above, and it is possible to selectively vary a chamber in the cylinder to afford a variable air reservoir. Such selective variance makes it possible to adapt the brake unit for different orders of brake loadings, considered from the standpoint of car weight, or from the standpoint of different kinds of brake shoes that exhibit different friction values.

As explained above, the cylinder 21 is bolster-mounted through the medium of the slack adjuster housing, and it was also explained that the piston 55 is arranged concentrically within the cylindrical side wall 54 of the cylinder. Thus, the cylinder affords a chamber 83, FIG. 3, into which air under pressure is admitted through a flanged fitting 83', FIG. 2, forcing the piston outward. The piston is returned by an extension spring 84, hereinafter described in detail.

The piston, as will be evident in FIG. 3, is W-shaped in section, including an annular sleeve-like outer wall 85, and a V-shaped end wall 86, the apex of which is defined by the semi-spherical surface 56 referred to above. Thus, the exterior of the piston end wall 86 presents a relatively large recess which is permissive of motion of the push rod 26 in all directions, and at the same time the interior surface of the end wall 86 is spaced radially from the inner surface of the side wall 85 to define a chamber 90.

Thus, the interior of the piston, it will be recognized, itself defines an annular chamber 90 constituting what can be viewed as a variable air reservoir. The relatively large volume that is afforded by the chamber 90 between the outer or side wall 85 and the end wall 86 of the piston within the cylinder chamber 83 is adapted to be filled by a dense filler 92, such as polystyrene, effective to displace a selected portion of the internal piston chamber 90. In the instance of a light car, the filler or ballast 92 is removed to enable a larger air volume to be realized for producing a drop in air pressure at the time the brake is to be applied to thereby lessen the brake force. In other words, with the filler 92 removed, the piston chamber itself becomes a drain on the supply of air under pressure directed into the cylinder chamber 83.

On the other hand, with the filler 92 present in its entirety, the aforementioned reservoir afforded by the piston is entirely displaced, and this arrangement will be resorted to in the instance of the most heavy cars. For cars of intermediate weight, the filler 92 will only be partially displaced.

The chamber 90 can be varied in like manner to accommodate brake shoes having different coefficients of friction. The cylinder 21 is adapted to take side or thrust loadings as may be engendered by a cocked or canted push rod. To this end, annular bushings are afforded between the opposite axial surfaces of the side wall 54 of the cylinder and the side wall 85 of the piston. The side wall 85 of the piston is formed with an annular external collar 93 which includes a peripheral reecess 94 in which is seated a low friction bushing, preferably of a durable long-wearing synthetic such as nylon plastic or Delrin plastic, and this bushing presents a slightly projecting smooth outer surface adapted to travel along the smooth machined bore 54B presented by the internal surface of the sleeve 54 of the cylinder 21.

A separable annular flange 100 is secured by bolts 101 to the open or non-pressure end of the cylinder 21. The flange 100 includes a collar 105 having an inner diameter corresponding approximately to the outer diameter of the sleeve 85 of the piston 55. The outermost end of the collar 105 is formed with an annular recess 106 in which is seated a resilient wiper 107 that bears on the machined outer surface of the piston side wall 85.

The opposite or inner end of the collar 105 is provided with an annular recess 110 in which is seated a lubricator wick 112 that bears on the piston side wall 85, the wick 112 being impregnated with a rust inhibitor compound.

Intermediate the recesses 106 and 110, the collar portion 105 of the flange attachment 100 is formed with an annular recess 115 in which is seated a bushing 116 of a material similar to or identical with that of which the bushing 95 is composed. The bushing 116 projects slightly beyond its seat or recess, as in the instance of the bushing 95.

The radial thickness of the collar 105 is approximately equal to the radial thickness of the annular boss 93 that is part of the piston sleeve. Resultantly, the piston sleeve is spaced inwardly of the cylinder sleeve, establishing an intervening air space or chamber 120 between the collar 105 and the boss 93.

The cylinder sleeve 54 is formed with a plurality of radially extended apertures 117 in which are seated porous metal air filters 118 which will admit air to, but exclude water from, the annular atmospheric chamber 120 that is established between the cylinder wall 54 and the piston wall 85.

The cylinder chamber 83 is sealed by a lubricant impregnated packing on annular seal 121 of U-shape section arranged in an annular seat afforded by the innermost wall of the boss 93 and an annular lip 122 at the innermost end of the piston.

Screws 123, FIG. 3, are seated in lugs 124 at the back of the cylinder end wall 47. At the time of installation, the screws 123 are backed off until the heads are in contact with the adjacent wall of the bolster 25. Thus, the cylinder 21 can be accommodated to a wide variety of bolster shapes and, if desired, the lugs 124 in which the bolts 123 are seated, can be used for truck mounting through spacer plates.

The piston return spring 84 is associated with a pair of seats 126 and 127 respectively secured to the piston 55 and the cylinder 21. These seats are in the form of aluminum castings, and it will be observed that the seat 126 includes an annular shoulder 128 engaged by a lip 129 included as part of a spring seat retainer 130. The retainer 130 is of annular form and includes a flat end surface provided with an annular groove 131 in which is seated a seal or gasket 132 that bears on an annular shoulder 135 that is formed on the inner surface of the end wall 86 of the piston 55.

The spring seat retainer 130 is secured in position by cap screws 136 having heads seating in recesses formed in the end wall 86 of the piston, with the threaded ends thereof secured in tapped openings in the retainer 130.

In securing the spring seat 127 in place, it is to be first noted that the inner surface of the end wall 47 of the cylinder 21 is formed with an annular, inwardly directed boss 139. The boss 139 is provided with tapped openings 140, and the spring seat 127 is formed with an annular recess 143 adapted to fit the boss 139. The end of the spring seat 127 adjacent the spring seat 126 is formed with mounting recesses 145 adapted to receive the head ends of attaching cap screws 146 having the threaded ends thereof secured in the tapped openings 140, whereby the spring seat 127 is secured in place.

Both seats 126 and 127 are formed with ribs 126R and 127R complemental to the turns of the spring 84, whereby the spring 84 at the opposite ends thereof is secured to the spring seats. Hence, upon outward movement of the piston the spring 84 is extended and is therefore stressed to return the piston when fluid under pressure is released from the cylinder chamber 83.

*Manual slack adjuster*

The slack adjuster housing 22 is located on top of the bolster 25 behind the pressure end or wall 47 of the air cylinder 21 in such a manner as to accomplish slack adjustment by positioning the strut 42 associated with the upper end of the dead lever 40. As shown in FIG. 4, the end of the strut 42 adjacent the slack adjuster housing 22 is provided with a semi-spherical surface 42b which neatly accommodates the ball element 78B in affording the ball joint 78 referred to above.

The ball 78B is formed at the end of the axially movable slack adjuster rod 80 which is the slack adjusting element, and in order to hold the rod 80 against rotation, for reasons apparent from what is hereinafter described, the end of the strut 42 is provided with a pair of slots or keyways 42K receiving a pair of corresponding lugs 140 and 141 formed on the external surface of the ball 78B.

The slack adjuster is shown in FIG. 4 in its fully retracted or "new shoe" position. As the shoes wear, compensating adjustment is made by turning a handle 145 that is accessible through a slot 42S formed in the strut 42 as shown in FIG. 2.

The handle 145 includes a hollow tube or sleeve 146 which concentrically surrounds one end of a drive shaft 148, adapted to turn a screw as hereinafter described. The handle 145 is secured to the shaft 148 by a pin 149, such that upon turning the handle 145 the shaft 149 is turned. In this connection, it will also be observed that the adjusting rod 80 is formed with a bore 80B. The sleeve portion 146 of the handle 145 extends into the bore 80B, and the handle 145 is secured against axial displacement relative to the rod 80 by pins 151 and 152 in the manner shown in FIG. 4.

The drive shaft 148 is formed with elongated slots 153 and 154 that extend the length thereof, and keys 157 and 158 fit therein. The keys 157 and 158 also fit in slots 161 and 162 that are formed in a tube 165 which is provided with an external screw. The keys 157 and 158 are retained against axial displacement by pins 166 and 167 as shown in FIG. 4.

The slack adjuster rod is disposed in a bore 22B' in the housing 22. The rod is free for axial in and out movement relative thereto, but is constrained against rotation as observed above. The tube or screw 165, however, is retained against axial displacement, while being freely rotatable. To this end, the tube 165, at the end remote from the handle 45, is formed with an aperture 165A in which is fitted a pin 170 in turn having the ends thereof disposed in openings in a cup-shaped thrust collar 171 retained within a recess at the end of housing 22 adjacent the cylinder 21. The pin 170 is drilled at one end, and a retainer pin 172 seats therein, the pin 172 being pressed into an opening in the collar 171.

An annular recess 175 is formed in the outer surface of the thrust washer 171 and pins 176, mounted in the end of the slack adjuster housing 22 adjacent the cylinder 21, have their mid-portions projecting tangentially through the annular recess 175 sufficiently to retain the thrust collar against axial movement while permitting free rotation thereof.

Since the rod 80 is internally threaded to mate with the screw 165, rotation of the latter causes axial movement of the slack adjuster rod 80, and this movement is transmitted to the dead lever strut 42, and from thence to the brake beams to adjust the position of the shoes 30 and 30A relative to the treads of the car wheels.

When the brakes are applied, the reaction load appears at the dead lever strut 42 and is communicated to the slack adjuster rod 80 and from thence to the screw 165. The end of screw 165 remote from the strut 42 bears against a shoulder formed on an end plug 178, having an opening through which the pin 170 is extended. The end plug 178 transmits the reaction force to the thrust washer 171, and from thence to the slack adjuster housing. It will be seen that the reaction force, when the brake is engaged, is exerted on the slack adjuster housing, along an axis parallel to the axis of the cylinder 21. The bolster 25, therefore, is subjected to any moment along an axis parallel to and not greatly removed from the axis of the cylinder 21. The bolster, therefore, is not subject to any large moments.

By having the end plug 178 a separable element, close tolerance problems are avoided, and this plug together with the thrust element 171 compensates for misalignment which might over-stress components. It may be noted that eccentric loading of the screw 165 is avoided by having large gaps between the plug 178, the pin 170 and the thrust member 171.

It will be observed from FIG. 4 that the operating screw 165 for the slack adjuster rod 80 is not exposed to atmospheric conditions, and can therefore be lubricated for long life. The adjuster elements are all in compression, and by locating the slack adjuster behind the cylinder, this relieves the bolster of reaction stresses, as noted. In conventional equipment, the dead lever strut, secured directly to the bolster as it is, tends to stress and rotate the bolster.

*Automatic slack adjuster*

As mentioned above, the present brake unit is capable of accommodating an automatic slack adjuster, and especially one of such nature as to be controlled by the screw 165. The automatic slack adjuster is illustrated somewhat schematically in FIG. 5, and automatic adjustments are created as may be required at the time the piston 55 is returned by the extensible return spring 84. It will be realized from this that the amount and direction of rotation of the screw 165 is determined by the position of the piston 55 when the brakes are applied.

The elements of the slack adjuster that account for automatic slack adjustment are arranged within a cam housing 180 interposed between the end wall 47 of the cylinder 21 and the adjacent end wall of the slack adjuster housing 22 described above.

Figure 5:
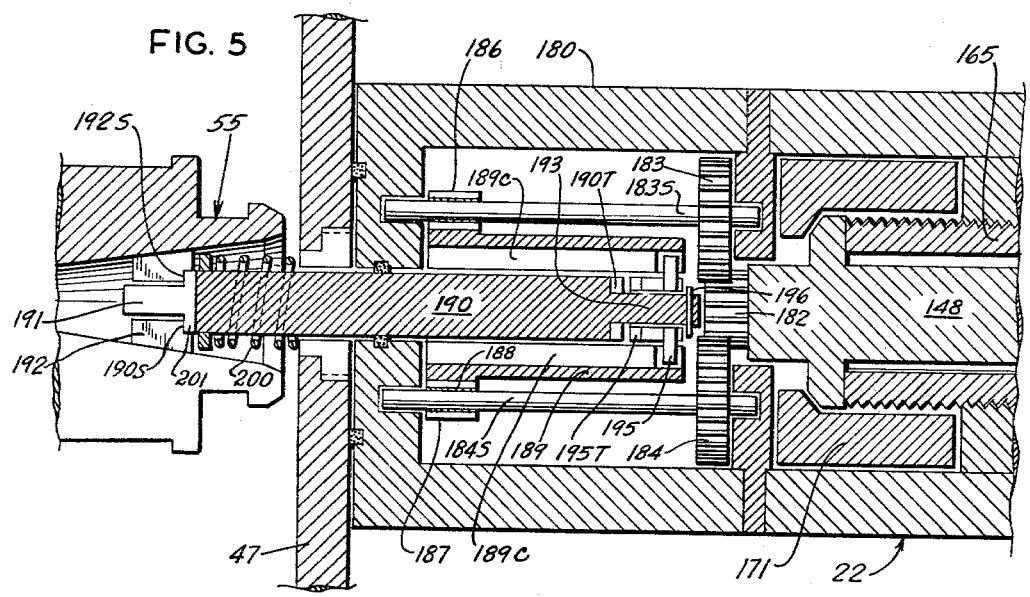
FIG. 5 is a somewhat schematic view of an automatic slack adjuster capable of being used in the present brake unit.

The drive shaft 148 is adapted for automatic slack adjustment by having a pinion gear 182, FIG. 5, fixed to the end thereof that is adjacent the cam housing 180. Gears 183 and 184, within the housing 180, have the teeth thereof meshed with the gear 182. The gears 183 and 184 are carried by respective drive shafts 183S and 184S which have their ends supported for rotation in the manner illustrated in FIG. 5.

Pinion gears 186 and 187 are carried on the ends of the shafts 183S and 184S opposite the gears 183 and 184. The gears 186 and 187 are meshed with a ring gear 188 that is included as part of a sleeve 189 formed with a plurality of internal cam slots (or rib equivalents) 189C, these slots being fully symmetrical one to the other.

A cam drive shaft 190 is arranged coaxially within the cam sleeve 189. This shaft is non-rotatable but is axially shiftable and is extended outward of the cam housing 180, through the end wall 47 of the cylinder 21, and the end thereof that is within the cylinder 21 is keyed at 191 in an opening formed in a lug 192 included as part of the piston 55. The lug 192 has a shoulder 192S engaging a shoulder 190S on the shaft 190 to return the shaft 190 with the piston 55 as hereinafter described.

The end of the drive shaft 190 that is within the cam sleeve or barrel 189 is reduced in diameter at 193. A cam follower 195 is rotatably mounted on the reduced end 193 of the drive shaft 190, and is free to slide axially thereon. However, endwise displacement of the cam follower is prevented by a ring or washer 196 affixed to the free end of the shaft 190 within the housing 180.

The cam follower has fingers disposed in the cam slots 189C.

The cam follower also has a toothed end 195T formed with teeth adapted to mesh with corresponding teeth 190T on the portion of the shaft 190 that is adjacent thereto.

A coil spring 200 is arranged on the shaft 190, being interposed between the inner surface of the cylinder end wall 47 and a collar 201 fixed to the cam drive shaft 190. This spring is compressed when the piston 55 is retracted in a brake disengaging position. However, when the brake is engaged, the spring 200 is effective to cause the drive shaft 190 to move axially to the left, FIG. 5, to follow the forward travel of the piston 55. The teeth 190T and 195T are disengaged at this time, and the cam follower, having its fingers in the cam slots 189C, merely rotates in an idle fashion on the reduced end 193 of the drive shaft 190. However, when the brakes are released, the piston return spring 84 is effective to force the drive shaft to the right as viewed in FIG. 5 producing engagement between the teeth 190T and 195T.

The cam drive shaft 190 is non-rotatable as noted, and therefore during return movement of the piston the cam follower, now fixed by the engaged teeth 190T–195T against rotation, rotates the cam sleeve 189 in accordance with the configuration of the cam slots. As a consequence of this, the ring gear 188 is turned and drives the pinions 186 and 187. The drive shafts 183S and 184S are rotated, and the gears 183 and 184 impart rotary motion to the pinion 182 carried on the screw drive shaft 148.

The internal cam 189 is so configured that if the piston 55 has exceeded its nominal stroke, the cam 189 will rotate to the point of nominal stroke, during return movement of the piston 55, and from that point half-way to the rest position so as to take up slack. From the point half-way to the rest position, to the point at rest position, the cam rotates so as to pay out slack. The result is a net take-up if the piston stroke is too long; a net pay-out if the stroke is too short; and mere oscillation of the screw 165, but no net rotation, if the piston stroke is just right.

Referring to FIG. 5A, the shape of the internal cam is illustrated diagrammatically. Point A on the cam represents the at-rest or disengaged position of the brake, and point B represents the maximum tolerable piston stroke. Point C represents the nominal piston stroke. Therefore, a piston stroke characterized by movement of the cam follower 195 from point A to point C merely characterizes oscillation and no net rotation of the slack adjusting stroke 165. Any shorter travel requires pay-out of slack as will be evident from what is shown in FIG. 5A, and travel of the cam follower beyond point C in the direction of point B characterizes a piston stroke that is too long, and hence net take-up rotation of the screw 165 during the return stroke of the piston 55.

It will be recognized from the foregoing description of the automatic slack adjuster that the gear 182, on the drive shaft 148, is a driven gear that may have net slack adjusting rotation imparted thereto by the drive gear means associated with the ring gear 188 on the rotatable cam barrel or sleeve 189. The latter may be rotated a net amount by the one-way cam follower 195 effective on the cam 189C, during the return stroke of the piston, to impart net rotary movement thereto by an amount corresponding to the extent the piston stroke departs from the nominal predetermined working stroke. The cam 189C presents a profile of slack adjustment movement as shown in FIG. 5A. The cam barrel itself could be used to impart slack adjuster rotation directly to the screw drive shaft 148. Greater torque would be achieved in this manner, but the gearing described results in a faster adjustment.

*Hand brake*

Hand brake application presents a problem in connection with truck-confined brakes, since the power unit for the hand brake is of necessity confined to the body of the car in contrast to the package brake unit confined to the truck. The situation is aggravated by motion of the truck relative to the car body when the train is rounding a curve.

Figure 6:
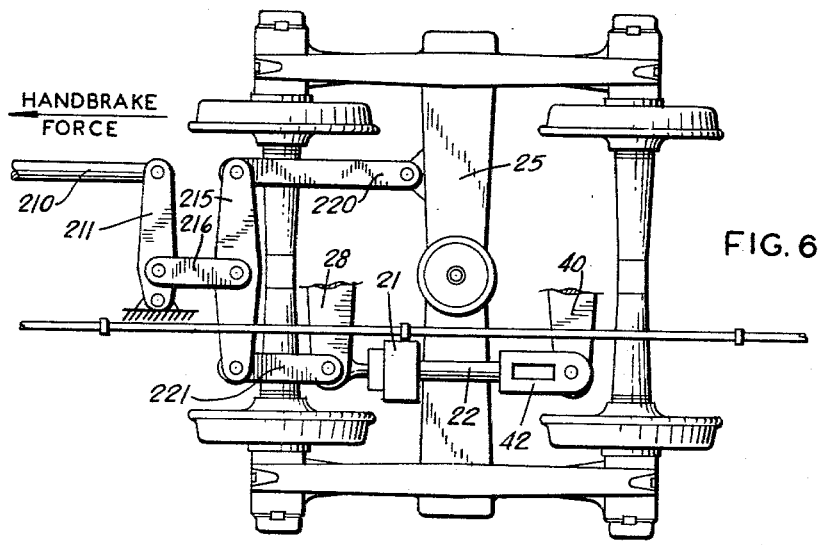
FIG. 6 shows the manner in which a hand brake link can be associated with the present brake unit.

The manner in which these problems are solved under the present invention is illustrated in FIG. 6. A rod 210 is connected to the hand brake power source so as to be pulled to the left along the axis of the car, as viewed in FIG. 6, when the hand brake is applied. The rod 210 is pivotally connected through a pin to one end of a body lever 211 fulcrummed on the body of the car. Lever 211 is at right angles to rod 210, and between its ends is pivotally connected to the midpoint of a floating lever 215, through a link or cross rod 216. The floating lever is parallel and centered with respect to the bolster. The lever arms are so selected that the force in the rod 210 is multiplied in being applied to the floating lever 215 to establish therein twice the usual force exerted by the push rod 26.

The floating lever 215 at one end is pivotally connected to a rod 220 in turn connected to the bolster 25 to extend normal thereto. The floating lever 215 at its opposite end is pivotally connected to a rod 221 in turn connected to the end of the live lever 28.

The floating lever 215 is supported symmetrically about the center of the truck so that as the truck rotates the center of the floating lever rotates, but does not translate with respect to the car body. The hand brake linkage 210–211–216 is thus isolated from the effects of truck swing. Additionally, the net turning moment on the truck is zero, since the truck bolster moment created by rod 220 is equal and opposite that created by the dead lever strut 42 at the slack adjuster housing 22.

Conclusion

The present brake unit is one which, except for the hand brake attachments, is completely confined to the car truck, and in the instance of the hand brake attachments these are symmetrically arranged to produce little or no net moment on the bolster. This same feature is, as explained above, also a characteristic of the cylinder 21 and the slack adjuster associated therewith.

The present brake unit requires only a single cylinder per truck, and the hand brake is easily accommodated. Pin wear in the linkages is reduced to a minimum, since these are for the most part relieved of stresses by having the cylinder and slack adjuster secured as a unit to the bolster, which is spring supported, while utilizing the universal joints described above.

The brake beams, the levers and the struts are familiar items to car manufacturers, and consequently the present brake unit does not require drastic revision in standardized concepts or manufacture when accommodating the present brake unit to a car truck.

The cylinder and slack adjuster are so constructed as to enable the brakes to be efficiently applied with minimum stressing even though the push rod is cocked or canted with respect to the axis of the cylinder, this being made possible by the universal joints that are employed. Additionally, the cylinder is capable of absorbing side loading by virtue of the bushings interposed between the side wall of the cylinder and the side wall of the piston.

The slack adjuster screw, confined as it is in the slack adjuster housing, is protected against corrosion or contamination, and the manual slack adjuster can be easily altered for automatic control.

Hence, while preferred embodiments of the present invention have been disclosed, these are capable of variation and modification, and I therefore do not wish to be limited to the precise details set forth, but desire to avail myself of such changes and alterations as fall within the purview of the following claims.

I claim:

1. In a brake unit for a railroad car having a truck having side frames and a bolster, spring means supporting said bolster on said truck, one brake beam operated by a live lever and another brake beam operated by a dead lever; a bottom rod joining aligned ends of the levers beneath the bolster, a slack adjuster housing, and a cylinder for fluid under pressure, secured as a unit to the bolster, said cylinder having a piston operatively connected to the live lever to apply a braking force upon the admission of fluid under pressure to said cylinder, said slack adjuster housing having an axially extendible element disposed therein for slack adjusting movement, and said slack adjuster element being operatively connected to one end of the dead lever.

2. A brake unit according to claim 1 wherein said operative connections include universal joints.

3. A brake unit according to claim 1 wherein a pair of bushings are interposed between and concentrically related to the piston and cylinder to enable side thrusts on the piston to be accommodated.

4. A brake unit according to claim 1 wherein a variable chamber is afforded within said cylinder.

5. In a brake unit for a railroad car having a truck having side frames and a bolster, spring means supporting said bolster on said truck, one brake beam operated by a live lever and another brake beam operated by a dead lever; a bottom rod joining adjacent ends of the levers beneath the bolster, a slack adjuster housing, and a cylinder for fluid under pressure, secured as a unit to the bolster, said cylinder having a piston formed with an external universal socket for receiving the end of a push rod, said push rod being joined to the live lever by a universal joint to apply a braking force thereto upon the admission of fluid under pressure to said cylinder, said slack adjuster housing having an axially extendible screw-operated rod disposed therein for slack adjusting movement, said rod being connected to one end of the dead lever by means having a universal movement, a screw confined within the slack adjuster housing and secured therein against axial displacement, and means for rotating the screw the extent required to take up slack in the brake unit due to shoe wear.

6. In a brake unit for a railroad car having a truck having side frames and a bolster, spring means supporting said bolster on said truck, one brake beam operated by a live lever and another brake beam operated by a dead lever, a bottom rod joining the levers beneath the bolster, a slack adjuster housing and a cylinder for fluid under pressure secured to the bolster, said cylinder having an external socket affording a universal socket for an end of a push rod operatively connected at its opposite end to the live lever to apply a braking force upon the admission of fluid under pressure to said cylinder, piston return means in the form of an extension spring operatively connected to the piston within the cylinder, said piston having a chamber within said cylinder adapted to be displaced in whole or in part by a filler which converts said chamber to a variable reservoir for fluid under pressure admitted to said cylinder, said slack adjuster housing having an axially extendible element disposed therein for slack adjusting movement, and said element being connected to one end of the dead lever.

7. A brake cylinder having a piston therein to be operated by fluid under pressure and comprising a housing including an end wall and a sleeve-like side wall extending axially therefrom, a piston having a sleeve-like side wall concentrically arranged within the cylinder, said piston at its outer end being adapted to have a push rod associated therewith by way of a universal joint, a piston return spring of the extensible type within the cylinder, slide bushings arranged between the opposed axial surfaces of the cylinder and piston side walls enabling the cylinder to absorb side thrusts as may be engendered by a cocked push rod, and said piston within the cylinder presenting a concave contour defining a chamber of appreciable volume adapted to be at least partly displaced by a dense filler converting said chamber to a variable reservoir for fluid under pressure admitted to said cylinder.

8. A brake cylinder having a piston therein to be operated by fluid under pressure and comprising a housing including an end wall and a sleeve-like side wall extending axially therefrom, a piston arranged within the cylinder, a piston return spring of the extensible type within the cylinder, slide bushings arranged between the opposed axial surfaces of the cylinder and piston enabling the cylinder to absorb side thrusts, and said piston within the cylinder presenting a chamber of appreciable volume adapted to be at least partly displaced by a dense filler thereby converting said chamber to a variable reservoir for fluid under pressure admitted to said cylinder.

9. A brake cylinder having a piston therein to be operated by fluid under pressure and comprising a housing including an end wall and a sleeve-like side wall extending axially therefrom, a piston having a sleeve-like outer wall concentrically arranged within the side wall of said cylinder, said piston having a V-shaped end wall diverging rearwardly and inwardly from the outer end of said piston side wall, and slide bushings arranged between the opposed axial surfaces of the cylinder and piston enabling the cylinder to absorb side thrusts encountered by the piston.

10. A cylinder according to claim 9 having an extensible piston return spring operatively connected to the piston within the cylinder.

11. In a brake unit for a railroad car having a truck having side frames and a bolster, spring means supporting said bolster on said truck, one brake beam operated by a live lever, another brake beam operated by a dead lever, and a rod joining the levers, a slack adjuster housing and a single cylinder for fluid under pressure secured to the bolster, said cylinder having a piston operatively connected to one end of the live lever to apply a braking force upon the admission of fluid under pressure to said cylinder, said slack adjuster housing having an axially extendible element disposed therein for slack adjusting movement substantially parallel to the axis of said cylinder, said slack adjuster element being operatively connected to one end of the dead lever, and means for applying brake reaction forces to the slack adjuster housing.

12. In a brake unit for a railroad car having a truck having side frames and a bolster, spring means supporting said bolster on said truck, one brake beam operated by a live lever, another brake beam operated by a dead lever, and a rod joining the levers, a slack adjuster housing and a one cylinder for fluid under pressure secured to the bolster, said cylinder having a piston operatively connected to one end of the live lever to apply a braking force upon the admission of fluid under pressure to said cylinder, said slack adjuster housing having an axially extendible element disposed therein for slack adjusting movement substantially parallel to the axis of said cylinder, and said slack adjuster element being operatively connected to one end of the dead lever.

13. In a brake unit for a railroad car having a truck having side frames and a bolster, spring means supporting said bolster on said truck, one brake beam operated by a live lever member, another brake beam operated by a dead lever member, and a rod member joining the levers, a slack adjuster housing and a cylinder for fluid under pressure arranged substantially coaxially and secured as a unit to the bolster, said cylinder having a piston operatively connected to one end of the live lever to apply a braking force upon the admission of fluid under pressure to said cylinder, and said slack adjuster housing having an axially extendible element disposed therein for slack adjusting movement, said element being operatively connected to one end of the dead lever member.

14. In a brake unit for a railroad car having a truck having side frames and a bolster, spring means supporting said bolster on said truck, one brake beam operated by a live lever, another brake beam operated by a dead lever, and a rod joining the levers, a slack adjuster housing and a cylinder for fluid under pressure secured to the bolster, said cylinder having a piston operatively connected to one end of the live lever to apply a braking force upon the admission of fluid under pressure to said cylinder, said slack adjuster housing having an axially extendible element disposed therein for slack adjusting movement substantially parallel to the axis of said cylinder, said element being connected to one end of the dead lever, and a hand brake attachment including: a floating lever parallel to the bolster and symmetrically centered with respect thereto, one end of the floating lever being connected to the bolster by a connecting rod, the other end of said floating lever being connected to the live lever by a link, a body lever adapted at one end to be fulcrummed on the car body and adapted at the other end to be operated by a hand brake lever, and a cross rod joining the body rod and the floating lever.

15. A brake cylinder having a piston therein to be operated by fluid under pressure and comprising a housing including an end wall and a sleeve-like side wall extending axially therefrom, a piston having a sleeve-like side wall concentrically arranged within the cylinder, said sleeve-like side wall of said piston being of a length generally coextensive of the sleeve-like side wall of said housing, said piston having a V-shaped end wall diverging rearwardly and inwardly from the end of said piston side wall to form a chamber between said V-shaped end wall and said sleeve-like outer wall of said piston, filler means disposed in said chamber to reduce the volume of said chamber available for fluid under pressure admitted to said cylinder, and the outer surface of said V-shaped piston wall having a universal connection with a pushrod so as to permit universal movement of said pushrod.

16. The brake cylinder of claim 15 wherein an interior spring seat retainer is secured to said V-shaped outer wall, a spring seat retainer secured to said housing end wall, and a contractile spring means seated on said spring seat retainers and biasing said piston sleeve-like side wall to be disposed within said cylinder sleeve-like side wall.

17. The brake cylinder of claim 16 wherein each of said spring seat retainers has a plurality of annular grooves therein for receiving coils of said contractile spring to permit turning of said piston relative to said cylinder without winding of said contractile spring means.

References Cited by the Examiner
UNITED STATES PATENTS

| | | | |
|---|---|---|---|
| 884,694 | 4/08 | Weant | 92—132 X |
| 1,798,437 | 3/31 | Sauvage | 188—197 |
| 2,036,535 | 4/36 | Nelson. | |
| 2,093,062 | 9/37 | Watson | 92—135 |
| 2,096,463 | 10/37 | Moody | 188—196 |
| 2,181,041 | 11/39 | Baselt | 188—52 |
| 2,597,917 | 5/52 | Bent | 121—38 |
| 2,724,464 | 11/55 | Sale | 188—196 |
| 2,729,388 | 1/56 | Ringham | 92—59 X |
| 2,782,765 | 2/57 | Robinson | 121—38 |
| 2,792,790 | 5/57 | Capps | 92—249 X |
| 2,815,092 | 12/57 | Baselt | 188—52 |
| 3,046,062 | 7/62 | Wettstein | 92—168 |
| 3,101,814 | 8/63 | Newell | 188—153 X |

ARTHUR L. LA POINT, Primary Examiner.

A. JOSEPH GOLDBERG, DUANE A. REGER, EUGENE G. BOTZ, Examiners.